United States Patent [19]

Farrah et al.

[11] 3,717,843
[45] Feb. 20, 1973

[54] HOLOGRAPHIC SYSTEM FOR FORMING IMAGES OF BOTH STATIONARY AND MOVING OBJECTS

[75] Inventors: Harry Robert Farrah; Emanuel Marom, both of Oak Park; Rolf K. Mueller, Brighton, both of Mich.

[73] Assignee: The Bendix Corporation

[22] Filed: March 6, 1970

[21] Appl. No.: 17,274

[52] U.S. Cl. ................340/1 R, 73/67.5 H, 340/5 H, 343/17
[51] Int. Cl. ................................................G01s 9/66
[58] Field of Search.....340/1, 3, 5 H, 5 MP; 343/7.9, 343/17; 356/5; 73/67.5 H

[56] References Cited

UNITED STATES PATENTS

| | | | |
|---|---|---|---|
| 3,593,254 | 7/1971 | Glenn, Jr. et al. | 340/3 R |
| 3,506,952 | 4/1970 | Gabor et al. | 340/3 |
| 3,559,465 | 2/1971 | Preston, Jr. | 340/5 X |
| 3,284,799 | 11/1966 | Ross | 343/17 X |

*Primary Examiner*—Richard A. Farley
*Attorney*—William F. Thornton and Plante, Hartz, Smith and Thompson

[57] ABSTRACT

A holographic system capable of forming images of both stationary objects and objects that are moving with respect to the holographic system is described which includes means for irradiating an object with coherent, long wavelength radiation such as coherent acoustic or radio waves. The system also includes a receiving surface for receiving this radiation from the object and producing a plurality of electrical signals, each with a phase and amplitude determined by the nature of the object irradiated and equal to the phase and amplitude of the radiation received from the object at a particular position on the receiving surface. A hologram is produced from these signals by processing apparatus including gating means responsive to an electric reference signal which allows only those electric signals representing radiation received during a selected time interval to be further processed and used in forming the hologram. This time interval is selected considering the velocity of the relative movement between the object and the receiving means so that there will not be enough motion to degrade the hologram during the time interval in which signals which are actually used to form the hologram are received.

6 Claims, 2 Drawing Figures

INVENTORS
ROLF K. MUELLER
H. ROBERT FARRAH
EMANUEL MAROM
BY William J. Thornton
ATTORNEY

HOLOGRAPHIC SYSTEM FOR FORMING IMAGES OF BOTH STATIONARY AND MOVING OBJECTS

BACKGROUND OF THE INVENTION

1. Field of the Invention
Holography.

2. Description of the Prior Art

Holographic apparatus for forming images of objects when there is no relative movement between the objects and the apparatus is well known. It is also well known that the frequency of radiation received from a moving object will differ from the frequency of radiation directed onto that object by an amount defined by the formulas:

$$f \approx f_o (1 + 2v/u) \text{ for acoustic radiation and} \quad (1)$$

$$f \approx f_o (1 + v/u) \text{ for electromagnetic radiation} \quad (2)$$

for an embodiment in which there is no relative motion between the means for transmitting radiation to the object and the means for for receiving radiation from the object, and in which $v << u$.

where:
- $f_o$ = the frequency of radiation directed onto the moving object;
- $f$ = the frequency of the radiation received from the moving object;
- $v$ = the relative velocity between the holographic apparatus and the object, and is positive when the apparatus and object are moving toward each other and negative when they are moving apart; and
- $u$ = the velocity of the radiation.

All defined symbols will be used to represent only the specified quantity throughout, and will not be redefined.

This change in the frequency of radiation received from an object when there is a relative motion between the holographic apparatus and the object causes the amplitude and phase of the received signal to change at each point on the receiving surface. This change degrades the hologram being formed. The amount of change that can be tolerated varies with different applications and depends upon the quality of the image desired, but generally, a hologram will not be considered useful if the phase of the received signal at each point on the receiving surface is allowed to change as much as $\pi/2$ radians during the formation of the hologram. If the phase is allowed to change as much as $\pi$ radians, the resulting hologram will be incapable of producing any image at all.

SUMMARY OF THE INVENTION

The subject invention comprises a holographic viewing system capable of imaging both stationary objects and objects that are moving relative to means for transmitting radiation to an object and means for receiving radiation from the object. A preferred embodiment of the apparatus of this invention is illustrated which includes means for irradiating an object or scene to be viewed with coherent, long wavelength radiation such as coherent sound or radio waves for a selected time interval. This coherent, long wavelength radiation is received from the irradiated object by a receiving transducer surface which generates a plurality of oscillating electrical signals, each having a phase and amplitude equal to the phase and amplitude of the coherent radiation received from the object at a different position on the receiving surface. These electric signals are processed to produce a hologram by apparatus that includes gating or switching means that allow only those portions of the electric signals which represent radiation received from the object in a selected, short time interval to be used in forming the hologram. This selected time interval is selected so that there will not be enough relative motion during the formation of the hologram to degrade the hologram. The gating means also modify the electric signals, this modification being one step in the conversion of the electric signals to the proper form for formation of a hologram.

In the preferred embodiment the gating devices comprise transistor switching devices responsive to an oscillating electric control signal. The transistor switches transmit received electric signals only during the time interval in which the oscillating control signal is also supplied to the transistor switches. These devices modify the received electric signal by opening and closing in response to the oscillating control signal at a frequency equal to the frequency of the control signal. They remain closed during the time interval when no control signal is received. The output signals from the transistor gating devices are supplied to integrator devices which filter unwanted components from that signal, sum the received signals, to a display device. The integrator devices are also constructed so that each device adds a signal of the same value to the received signal to insure that the output signals from each integrator will be positive and therefore in proper form for producing a hologram across the surface. These electric signals are transmitted to a known display device which produces an image by forming a holographic pattern across a surface and illuminating that surface with a laser to form an image. The illustrated holographic system includes a control apparatus which provides decimal output signals that control the order in which the electric signals are supplied from the integrator devices to the display apparatus, and also includes means for providing the analog conversion of the decimal signals to the display device so that an electric signal representing coherent radiation received at a particular position on the receiving surface provides a holographic signal at a corresponding position of the surface of the display device upon which the hologram is formed.

The illustrated embodiment of this invention also includes control apparatus which allows an operator to select the length of the time interval during which radiation will be directed from a transmitter to the object to be viewed in order to allow an operator to select the depth of the scene to be viewed. That is, an operator can select the distance between the object closest the receiving apparatus to be included in the image formed and the object farthest from the receiving apparatus to be included in the image formed. An operator increases the depth of the scene viewed by increasing the length of the time interval over which radiation is directed onto that scene by the transmitting apparatus. The control apparatus also includes a delay device which allows an operator to select and vary the time interval between the initiation of transmission of radiation toward the scene to be viewed and the time at which the receiving and processing apparatus begins using received signals to form a hologram. This control allows an operator to adjust the range of the image formed, that is, the distance between the receiving apparatus and the object closest to the receiving apparatus which will be included in the image formed. As this time interval is increased, the range of the image will also be increased.

The timing devices for selecting the amount of relative motion that will occur during the formation of the hologram, the depth of scene of the image and the range of the image can be varied independently of each other. An operator can thus select any combination of values for the maximum relative velocity that an object may have with respect to the holographic system and still be included in the image formed, the depth of scene of the image formed and the range of the image formed.

BRIEF DESCRIPTION OF THE DRAWINGS

Further objects, features and advantages of this invention, which is defined by the appended claims, will become apparent from a consideration of the following description and accompanying drawings in which:

DETAILED DESCRIPTION OF THE DRAWINGS

Figure 1:
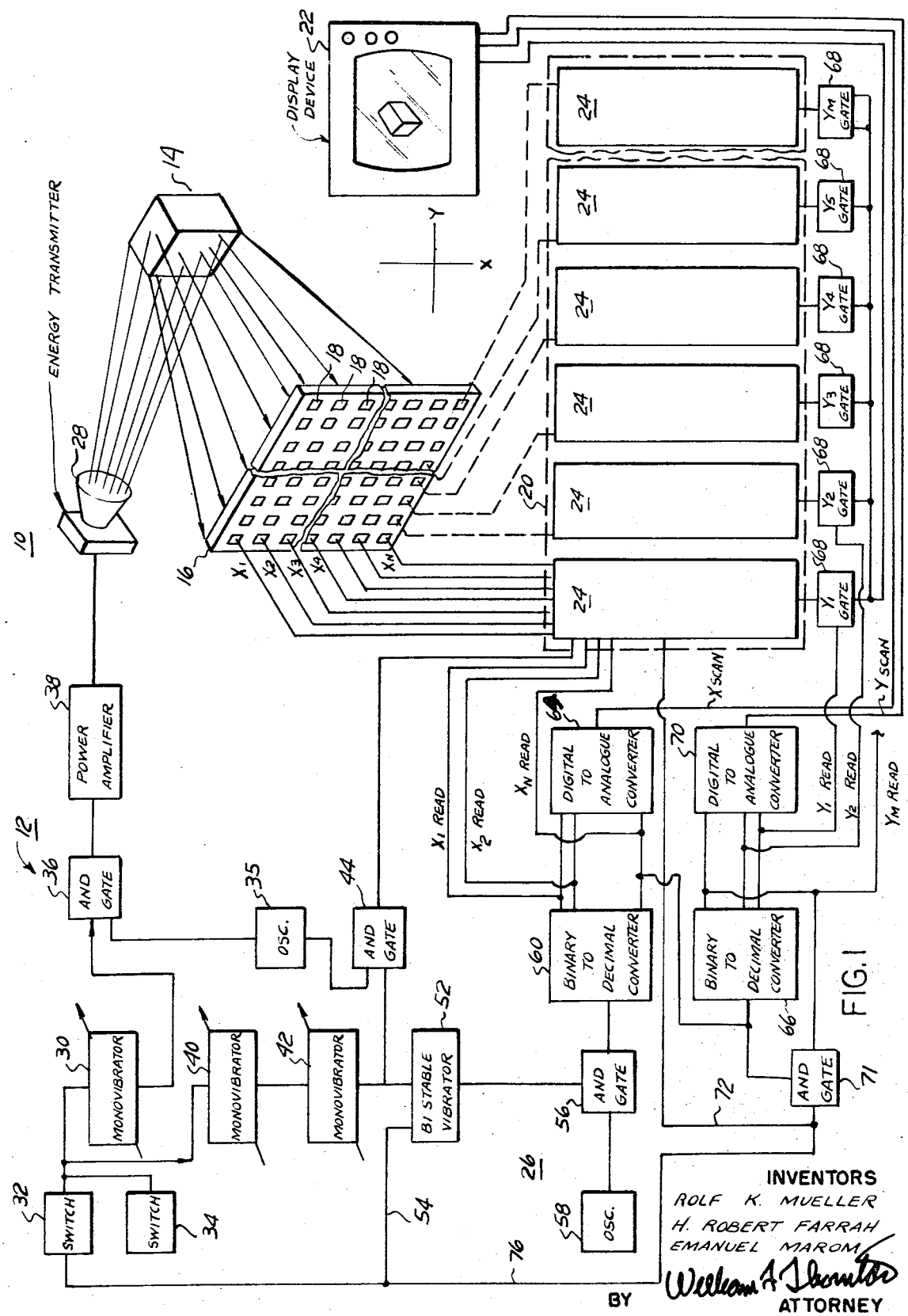
FIG. 1 is a schematic diagram of an embodiment of the apparatus of this invention.
Figure 2:
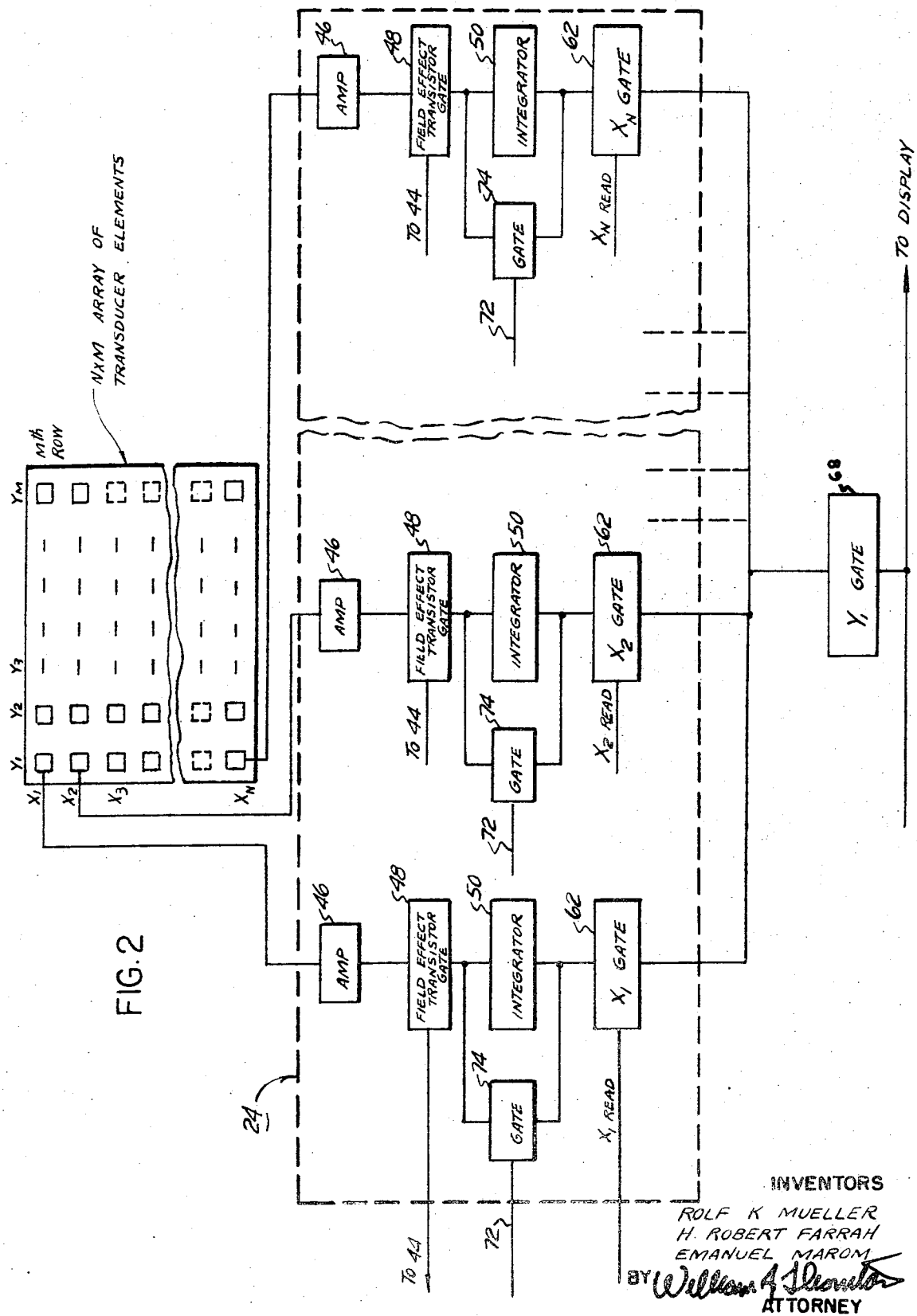
FIG. 2 is a detailed view of the apparatus which is shown generally in FIG. 1 for receiving radiation from an object and producing electrical signals which will form a holographic image.

FIG. 1 illustrates holographic system 10 that will form images of a scene or object when there is a relative motion between the scene or object and the system 10 as well as when there is no such relative motion. The system 10 includes apparatus 12 for producing and irradiating an object 14 with coherent, long wavelength radiation and receiving surface 16 have a plurality of individual transducers 18 which produce oscillating electric signals whose phase and amplitude represent the radiation striking each transducer. The electric signals from the transducers 18 are transmitted to signal gating and processing apparatus 20. The apparatus 20 is constructed to select a portion of the electric signal from each transducer 18 produced during a time interval whose length is determined by both the relative velocity of the object 14 with respect to the receiving surface 16 and by the noise content of signal striking the receiving surface 16. The apparatus 20 modifies the selected portions of the electric signals received from each transducer to create a holographic signal or hologram. That is, the electric signals are modified so that they represent the amplitude and phase of a wave front carrying three-dimensional information of an object and will produce an image of the object for an observer when transmitted in the proper order to a display device 22. A detailed view of a portion 24 of the signal gating and processing apparatus 20 for processing the signals from one transducer column of the receiving surface 16 is shown in FIG. 2. The operation of the signal gating and processing apparatus 20 and the device 22 is controlled by control and timing apparatus 26. The control apparatus 26 also controls the order in which individual electric signals are supplied from the signal processing apparatus to the display device 22.

The apparatus 12 for irradiating an object includes an energy transmitter 28 which produces coherent, long wavelength radiation when supplied with an oscillating electric signal. The apparatus for supplying an electric signal to transmitter 28 includes a monovibrator 30 which generates a direct current, step signal of constant amplitude when activated by either an electrically controlled switch 32 or manually operated switch 34, and also includes an oscillator 35 which continually provides a sinusoidally varying electric signal output. The monovibrator 30 is adjustable so that an operator can vary the length of time during which the monovibrator will continue to produce an output signal after being activated. The output signals from both the monovibrator 30 and oscillator 34 are transmitted to an AND-gate 36 which transmits an oscillating electric signal having a frequency equal to the frequency of the signal from oscillator 35 to power amplifier 38 only when signals are received from both sources. The output of amplifier 38 drives energy transmitter 28. The depth of scene of the image formed by the apparatus 10 is determined by the length of time that radiation is generated by transmitter 28. That is, the difference in the distances travelled by the various energy waves striking the receiving surface 16 at any one instant will be equal to the rate at which the energy travels times the length of time during which energy is produced by and transmitted from the transmitter 28. Since energy arriving at the receiving surface 16 is transmitted toward the object 14 from the transmitter 28 and is then reflected back toward the receiving surface 16 by object 14, the depth of scene of the image formed by the apparatus 10 is expressed by the equation:

$$\text{Depth of Scene} = \tfrac{1}{2} ut$$

where: $t$ = the time interval during which signals are produced by the monovibrator 30 and thus in which long wavelength radiation is produced by the transmitter 28.

The depth of scene of the image formed by the apparatus 10 can also be varied by varying the gating time interval provided by the apparatus 20 for selecting the limit of the maximum velocity an object may have with respect to the apparatus 10 and still appear in the image formed by that apparatus. If this velocity gating time interval is varied by a large enough value, and no corresponding adjustment of the monovibrator 30 is made, the depth of scene of the image formed by the apparatus 10 will be changed. However, when viewing moving objects, this velocity gating time interval will generally have to be so short that it will have little or no effect on the image depth of scene. In addition, since the monovibrator 30 is independent of the gating and processing apparatus 20, an operator will be able to select any desired depth of scene for any relative velocity gating interval. That is, if operating conditions require that the relative velocity gating interval provided by the apparatus 20 be decreased because of the high velocity of the object an operator wishes to view, he will be able to maintain a selected depth of scene simply by adjusting monovibrator 30 to increase the time interval during which that element provides an output signal upon being activated.

Radiation directed onto the object 14 is reflected from that object and received by the receiving surface 16. The surface 16 includes a plurality of transducers 18 that produce alternating current electric signals when irradiated. The output signals of the transducers 18 have a phase and amplitude equal to the phase and amplitude of the coherent radiation striking the transducers. The size, spacing, and number of transducers forming the receiving surface 16 is identical to that of embodiments of holographic devices for forming images of objects when there is no relative motion between the object and the holographic apparatus. This embodiment of the present invention is limited to the use of long wavelength radiation to form holographic images because information must be obtained from such closely spaced points on a surface in order to obtain a hologram from a light signal that there is no presently known transducing apparatus which will be capable of producing electric signals representing all of the required points. In addition, presently known transducer devices will not produce electric signals having a phase and amplitude equal to the phase and amplitude of the light signal striking the transducer. Coherent optic radiation could be used in the practice of this invention if such an apparatus were available.

Only those electric signals produced by the transducers 18 during a particular selected time interval are used in forming a holographic image. As has been discussed above, the length of this time interval determines the maximum velocity an object 14 may have relative to the transmitter 28 and receiving surface 16 and still be included in the image formed by the apparatus 10. The initiation of this time interval with respect to the time at which the transmitter 38 begins directing radiation toward object 14 determines the range of the image formed. The portion of the control apparatus 26 for selecting the range of an image includes monovibrator 40 which produces a direct current, step signal of constant amplitude when activated by either switch 32 or 34 and continues to maintain the signal output for a time interval selected by an operator. The signal produced by monovibrator 40 is supplied to a monovibrator 42 which is activated by the trailing edge of the signal output produced by monovibrator 40. That is, monovibrator 42 begins producing an output signal when monovibrator 40 stops producing an output signal. Monovibrator 42 is also adjustable so that an operator can select the length of time during which it will produce an output signal after being activated. The output signal from monovibrator 42 is transmitted to AND gate 44 along with the output signal from oscillator 35. AND-gate 44 provides an oscillating electric output signal only when input signals are received from both monovibrator 42 and oscillator 35. The output of AND-gate 44 has a frequency equal to the frequency from oscillator 35 and is transmitted to the signal processing apparatus 20. Apparatus 20 is constructed to use only those electric signals received from the transducers 18 during the time interval in which a signal is also received from AND-gate 44 to form a hologram. Since the monovibrator 40 is essentially a delay which determines the time at which signals will begin being transmitted from AND gate 44 to the processing apparatus 20, monovibrator 40 determines the range of the image formed by the apparatus 10. Coherent radiation from the transmitter 28 which strike objects closer to the surface 16 than the selected range of the image will arrive at the receiving surface 16 before the processing apparatus 20 begins receiving signals from AND-gate 44 and will therefore not be used in forming a hologram and will not be seen in the image formed. Monovibrator 42 determines the length of time that signals will continue to be supplied to the processing apparatus 20 and allows an operator to select the maximum relative velocity of objects that will be included in the image formed by the apparatus 10.

FIG. 2 illustrates a detailed view of a portion 24 of the signal processing apparatus 20. Each portion 24 processes signals received from one column of transducers 18 of the receiving surface 16. The electric signals from each transducer 18 are transmitted to an amplifier 46 which amplifies the signals for further processing and also provides an impedance match between the transducers 18 and the remainder of the signal processing apparatus 20. The signals from each of the amplifiers 26 are transmitted to a field effect transistor gate 48. The transistor gate 48 transmits signals received from the amplifiers 46 only when the transistor gate 48 also receives a signal from AND-gate 44. The field effect transistor gates 48 operate as switches which open and close in response to the oscillating signal received from AND gate 44 at a frequency equal to the frequency of the signal from that gate. Since the frequency of the signal from gate 44 is equal to the frequency of the radiation transmitter from transmitter 28, the electrical output signal from each field effect transistor gate 48 has a signal component with an amplitude that is proportional to the product of the amplitude of the signal from the transducer 18 associated with that gate 48 and the cosine of the phase difference between the reference signal from gate 44 and the signal from the transducer 18. The signals from the field effect transistor switches 48 are supplied to integrator devices 50. Integrating devices 50 filter out unwanted components from the signals received from the gates 48, integrate the unfiltered or selected components of the received signals, and store the integrated signals until they are to be read out and supplied to the display device 22. The integrators 50 act as electrical filters with a band width of approximately one-half the gating time interval of the gates 48. Integrators 50 also each add a signal of the same value to the integrated signal component so that the component stored in each integrator will have a positive value. This signal is added by the integrators 50 so that the stored signals will be in the proper form for producing a hologram when supplied to the display device 22.

The sequence in which stored signals are read out and supplied to the display apparatus 22 is determined by the portion of the control apparatus 26 (FIG. 1) including a bistable vibrator 52 which produces an output signal in response to the trailing edge of the output signal from monovibrator 42 and continues to provide an output signal until a signal is received along line 54. The output of bistable vibrator 52 is supplied to an AND-gate 56 along with a signal from an oscillator 58. The AND-gate 56 provides an output signal that drives a binary-to-decimal converter 60. Converter 60 provides square wave signal outputs along the lines labelled "$X_1$ Read" through "$X_N$ Read" to open the gates 62 in each of the portions 24 of the processing apparatus 20. These signals are transmitted in a cyclical time sequence so that the first output signal of a cycle is transmitted along line "$X_1$ Read" and the last signal of a cycle is transmitted along line "$X_N$ Read." Converter 60 continues to produce output signals as long as an input signal is received from gate 56. The gates 62 control the output from the integrators 50. The integrators 50 are constructed so that they maintain an output signal until they are reset to zero whenever a closed circuit is provided from the integrators 50. A converter 66 is constructed to provide an output signal along line "$Y_1$ Read" at the initiation of a read out operation to open $Y_1$ gate 68 while all other gates 68 are closed. The integrated signal components from transducers $X_1$ through $X_N$ comprising the first transducer column of the receiving surface 16 will thus be transmitted in order to the display device 22 in response to the first cycle of output signals from converter 60. The last signal in this cycle, that is, the output signal from converter 60 transmitted along line "$X_N$ Read," is also transmitted to the binary-to-decimal converter 66. When this signal representing the completion of the first cycle of output signals from converter 60 is received by converter 66, converter 66 stops transmission along line "$Y_1$ Read" and initiates transmission of a signal along line "$Y_2$ Read." Gate $Y_1$ is therefore closed and gate $Y_2$ is opened. The second cycle of output signals from converter 60 which are also transmitted in sequence along lines "$X_1$ Read" through "$X_N$ Read" will therefore cause the electric signals representing radiation received at the transducers $X_1$ through $X_N$ forming the second column of the receiving surface 16 to be transmitted to the display device 22. This operation is continued until all signals have been read out and supplied to the display device 22.

The output signals from converters 60 and 66 which determine the order in which stored electric signals are supplied to the display device 22, are also supplied to digital to analog converters 64 and 70, respectively. These devices convert the received decimal signals to analog signals which are transmitted to the display device 22 to control its operation. Display device 22 is a known display device which provides a holographic pattern on a surface in response to received signals and illuminates the surface with a laser to form an image for an observer. The display device 22 include scanning apparatus similar to the scanning apparatus in an ordinary television set for creating the holographic pattern. Each of the electric signals supplied to the display device 22 from the signal processing apparatus 20 control the magnitude of the holographic signal at some portion on the surface of the display device 22 upon which the holographic pattern is formed. The control signals supplied to the display apparatus 24 from the converters 64 and 70 control the X and Y xcanning motions respectively of the scanning apparatus of the display device 22. Since the control signals are merely the analog conversions of the signals that control the order in which the processed electric signal components are supplied to the display device 22, each signal component will create a portion of a holographic pattern at a position on the surface upon which the hologram is formed that corresponds to the position of the transducer 18 on the surface 16 represented by that electric signal component.

The output signals from converters 60 and 66 that are transmitted along lines "$X_N$ Read" and "$Y_M$ Read" respectively are also transmitted to an AND-gate 71. AND-gate 71 provides an output signal only when signals are received from both sources, that is, after the converters 60 and 66 have directed the reading out of the electric signals representing the radiation received by the last column of transducers of the receiving surface 16 and have therefore completed the read out operation. When signals are received from both sources, AND-gate 71 provides an output signal which is transmitted along line 72 to each gate 74 of the processing apparatus 20. This signal closes gates 74 and thus provides a short circuit across each integrator to clear the integrators. The output signal from AND-gate 71 is also transmitted along line 76 to switch 32 to initiate a subsequent cycle of operation of the apparatus 10.

In operation, an operator adjusts monovibrators 30 and 40 to select the depth of scene and range respectively of the image that will be formed by the apparatus 10. The selection of particular values for the depth of scene and range of the image depend upon the distance from the apparatus 10 of the objects which an operator wishes to view. He also adjusts monovibrator 42 to select the maximum velocity of the relative motion between an object and the holographic system that an object may have and also be included in the image formed by the system. The relative velocity gating time interval is selected so that the signals transmitted by the gating means and actually used in forming the hologram represent the irradiated scene for a time interval which is small enough so that there is insufficient time for enough relative movement to cause degradation of the hologram. As the gating time interval is decreased, the maximum relative velocity that an object may have and still be viewed holographically increases. If an object has a relative velocity greater than this maximum value, it will not be seen in the image formed. The selection of a relative velocity gating time interval can be determined mathematically by the following derivation. The electric signal representing the radiation received at a particular point on the receiving surface is given as a function of time by the expression:

$$\text{Voltage} = A_i \sin(2\pi ft + \phi_i) \quad (3)$$

where:
$A_i$ = the amplitude of the signal received at the position $i$ of the receiving surface;
$\phi_i$ = the phase of the signal received at the $i^{th}$ position of the receiving surface;
$f$ = the frequency of the received signal; and
$t$ = time.

The received signal is expressed as a function of the transmitted signal for acoustic radiation by using equations 1 and 3 to obtain the equation:

$$A_i \sin(2\pi ft + \phi_i) = A_i \sin[2\pi f_o t = (4\pi f_o vt/u) + \phi_i] \quad (4)$$

Equation 5 can be rewritten to simplify its format as:

$$A_i \sin(2\pi ft + \phi_i) = A_i \sin(2\phi f_o t + \gamma_i) \quad (5)$$

where: $\gamma_i = 4\phi f_o vt/u + \phi_i$.

If the relative velocity gating time interval is selected so that $\gamma_i$ is allowed to change by as must as $\pi$ radians, all holographic information will be destroyed and it will not be possible to form an image of the object. The gating time interval must therefore be selected so that $\gamma_t$ does not deviate from $\phi_t$ by more than $\pi$ radians. By applying this criterion to Equation 5, a gating time interval for forming a hologram having a relative velocity $v$ must fall within the interval:

$$0 < t < (4f_o |v|/u) \quad (6)$$

or rewriting $$0 < t < (\lambda/4 |v|) \quad (7)$$

The selection of a relative velocity gating time interval for an embodiment in which an object is irradiated with electromagnetic radiation such as radio waves can be determined mathematically by a derivation similar to the above derivation except that Equation 2 would be used in place of Equation 1. The time interval provided such a derivation is:

$$0 < t < (\lambda/2 |v|) \quad (8)$$

The exact selection of the gating time interval $t$ within the boundaries provided by the above equations depends upon the noise content of the received signal. If the received signal has very little or no noise component, the gating time interval will be selected to be as close to 0 as the physical limitations of the apparatus permit. If the received signal contains a substantial amount of noise, the gating time interval will be selected to be closer to the upper boundary of the appropriate one of Equations (7) and (8) in order to receive enough of a signal to maximize the signal to noise ratio. As an example of a practical value for the gating time interval for a typical acoustic holographic system where $\lambda = 1$ centimeter and the maximum relative velocity between the object being viewed and the transmitting and receiving surface is 500 centimeters per second, Equation 97) specifies that:

$$0 < t < 500 \mu \text{ seconds.}$$

For a signal having a typical noise content the gating time interval would be selected to be about 250 microseconds.

After adjusting monovibrators 30, 40, and 42, the operator initiates operation to form a first frame or picture of an image by activating switch 34. Energy transmitter 28 provides an output of coherent, long wavelength radiation for a time interval determined by the setting of monovibrator 30. This energy is reflected from an object 14 and received by a receiving surface 16. Each of the transducers 18 forming the receiving surface 16 provide an oscillating electric current output which represents the radiation striking that transducer. The electric signals produced in a time interval determined by operation of the monovibrators 40 and 42 are processed by the signal processing apparatus 20 and used in forming a holographic image. The signals used to produce a hologram are transmitted from the signal processing apparatus 20 to the display device 22 in a sequence determined by the control apparatus 26 which also controls the scan pattern of the display device 22. This hologram is illuminated with a laser to provide an image for an observer. Upon completion of the transmission of all stored signals to display 22 so that display 22 provides a complete image for an observer, a signal is supplied to switch 32 to reinitiate operation of the system 10 to produce a second frame or picture of the object 14. The system 10 thus provides a continuous series of images of the object 14 that form a real time display when applied to display device 22.

Having thus described an embodiment of this invention, what is claimed is:

1. A holographic system capable of providing a hologram of an object when there is a relative motion between the system and object as well as when there is no such relative motion comprising:

means for irradiating an object with coherent radiation capable of being converted into an oscillating electric signal;

means for receiving said radiation from said object and converting said received radiation to a plurality of oscillating electric signals representative of said received radiation;

means for simultaneously selecting a portion of each of said electric signals produced in one time interval that is sufficiently short so that there will not be enough relative motion between the object and the system to degrade the hologram formed by the system;

means for processing said selected signal portions to produce a sequence of signals representing a hologram;

means for displaying a holographic pattern on a surface; and control means for providing control signals to control the order in which said processed electric signals are supplied to said display means, said control means also supplying control signals to said display device to control the operation of said display device so that each of said processed signals supplied to said display means provides a portion of a holographic pattern at an appropriate position on said surface.

2. The holographic system set forth in claim 1 further including means for automatically activating the operation of said irradiating and selecting means upon the completion of the transmission of all said processed signals to said display means to thereby initiate the formation of another hologram, the formation of a series of holograms providing a real time holographic display.

3. In a holographic system for providing images of objects that are moving relative to the holographic system as well as of stationary objects including means for transmitting radiation having a predetermined carrier frequency to an object to be imaged, means for receiving said radiation from the object, and transducer means for producing a plurality of oscillating electric signals each having a phase and amplitude representing the phase and amplitude of radiation received from said object at a particular position, and means for using the oscillating electric signals to form a holographic image, the improvement comprising:

gating means for selecting and transmitting signals produced by the transducer means in a predetermined time interval to be used in forming a holographic image;

said gating means being responsive to an oscillating electric control signal having a carrier frequency substantially equal to the carrier frequency of the radiation transmitted to the object, and being constructed to open and close at a frequency substantially equal to the carrier frequency of said control signal when said control signal is received, and to remain closed when no control signal is received.

4. The system set forth in claim 3 in which said gating means comprises transistor switching apparatus constructed so that each transmitted signal output from said transistor switching apparatus has a component with an amplitude proportional to the product of the amplitude of one of the signals received from said transducer means and the cosine of the phase difference between said one received signal and said control signal.

5. The holographic system set forth in claim 4 further including integrator means for receiving said selected signals from said transistor switching means, said integrating means being constructed to filter unwanted components from said signals received from said transistor switching means, to integrate the unfiltered signal components, and to store said integrated signal components.

6. The holographic system set forth in claim 5 in which said integrator means are constructed to act as electrical filters having a band width equal to one half of said predetermined time interval of said transistor gating means, and in which said integrating means are also constructed to add electrical signals having identical values to each of said signals received from said transistor switching means so that said signals stored by said integrators will be in a proper form to produce a holographic image.

* * * * *